Dec. 23, 1958 A. P. TULLENERS 2,866,094

SYMMETRICAL TO ASYMMETRICAL SIGNAL CONVERSION CIRCUIT

Filed Sept. 29, 1954 2 Sheets-Sheet 1

INVENTOR
ANDRE P. TULLENERS
By [signature]
HIS ATTORNEY

Dec. 23, 1958 A. P. TULLENERS 2,866,094

SYMMETRICAL TO ASYMMETRICAL SIGNAL CONVERSION CIRCUIT

Filed Sept. 29, 1954 2 Sheets-Sheet 2

INVENTOR
ANDRE P. TULLENERS

By [signature]

HIS ATTORNEY

United States Patent Office 2,866,094

Patented Dec. 23, 1958

2,866,094

SYMMETRICAL TO ASYMMETRICAL SIGNAL CONVERSION CIRCUIT

André P. Tuileners, Arcadia, Calif., assignor to Hoffman Electronics Corporation, a corporation of California Application September 29, 1954, Serial No. 459,088

4 Claims. (Cl. 250—27)

This invention is related to driving circuits for the Chromatron-type color television picture tube, and more particularly to an improved driving circuit which may be adjusted to accommodate the unique parameters of any particular picture tube chosen for use.

In this disclosure and in the appended claims the word "Chromatron" shall be understood to include all present and future color television picture tubes in which are employed a plurality of parallel, adjacent, multi-color phosphor strips and a plurality of parallel grid wires each spaced in proximity with and parallel to its associated phosphor strip.

The Chromatron picture tube presently in use employs on its face plate a plurality of red, green, and blue phosphor strips which are parallel and adjacent to each other, alternating in the following order: red, green, blue, green, red, green, etc. Also employed are two grids, each consisting of fine wires spaced apart a distance equal to twice the width of each phosphor strip, which are enmeshed to constitute a single grid plane parallel to the tube face plate and in such disposition with respect to the tube face plate that each wire of one grid, the "red" grid, defines, in conjunction with the longitudinal axis of a respective red phosphor strip, a plane which is perpendicular to the plane of the picture tube face plate, and, correspondingly, each wire of the remaining grid, the "blue" grid, defines, in conjunction with the longitudinal axis of a respective blue phosphor strip, a plane which is perpendicular to the plane of the picture tube face plate. (For sake of simplicity of discussion, any slight horizontal and vertical curvature of the picture tube face plate will be neglected.)

Efforts to utilize such tubes have indicated the existence of difficulties in manufacturing them, which difficulties manifest themselves as slight transverse displacements in the color grid with respect to the phosphor strips, resulting in the planes including the several grid wires and their associated phosphor strips heretofore mentioned being slightly removed from the intended vertical disposition thereof with respect to the face plate. This conclusion is justified by reason of repeated observations that one of the color grids may require a greater driving voltage than the other color grid. Whatever the true explanation may be, it has become apparent that in order to avoid color distortion, the 3.58 mc. subcarrier signal fed to the color grids must be processed so as to form an asymmetrical wave form so as to meet the voltage requirements of the two color grids.

Therefore, it is an object of this invention to provide an improved color grid drive circuit for employment with a Chromatron color television picture tube which will preclude color distortion that might otherwise occur.

It is a further object of this invention to provide an improved color grid drive circuit which may be adjusted to satisfy the driving voltage requirements of the color grids of a Chromatron color television picture tube.

It is a still further object of this invention to provide an improved color grid drive circuit which will process the normally symmetrical sinusoidal 3.58 mc. color subcarrier so as to convert this signal into an asymmetrical signal which satisfies the voltage drive requirements of the Chromatron color television picture tube chosen for use.

According to this invention the 3.58 mc. color subcarrier is processed by a converter stage so as to constitute a 3.58 mc. asymmetrical signal the magnitudes of the positive and negative peak amplitudes of which satisfy the particular voltage requirements of the red and blue color grids of the Chromatron tube. The converter stage includes a pair of vacuum tubes operated in push-pull. The input side of this push-pull converter stage consists of a secondary winding of a coupling transformer (which may constitute a portion of an input tank circuit), this secondary winding being divided by means of a tap to constitute two separate inductance portions in the grid circuits of the push-pull tubes. At least one of these inductance portions is variable so that the ratio of the self-inductances exhibited by the two inductance portions may be varied as desired. The output signal of the converter stage will, accordingly, constitute a composite signal the ratio of the positive and negative peak amplitudes being dependent upon the ratio of self-inductance of the two inductance portions.

The features of the present invention which are believed to be novel are set forth with particularity in the appended claims. The present invention, both as to its organization and manner of operation, together with further objects and advantages thereof may best be understood by reference to the following description taken in connection with the accompanying drawings, in which:

Figures 1, 2, 3, 4, 5, 6, 7, 8, 9:
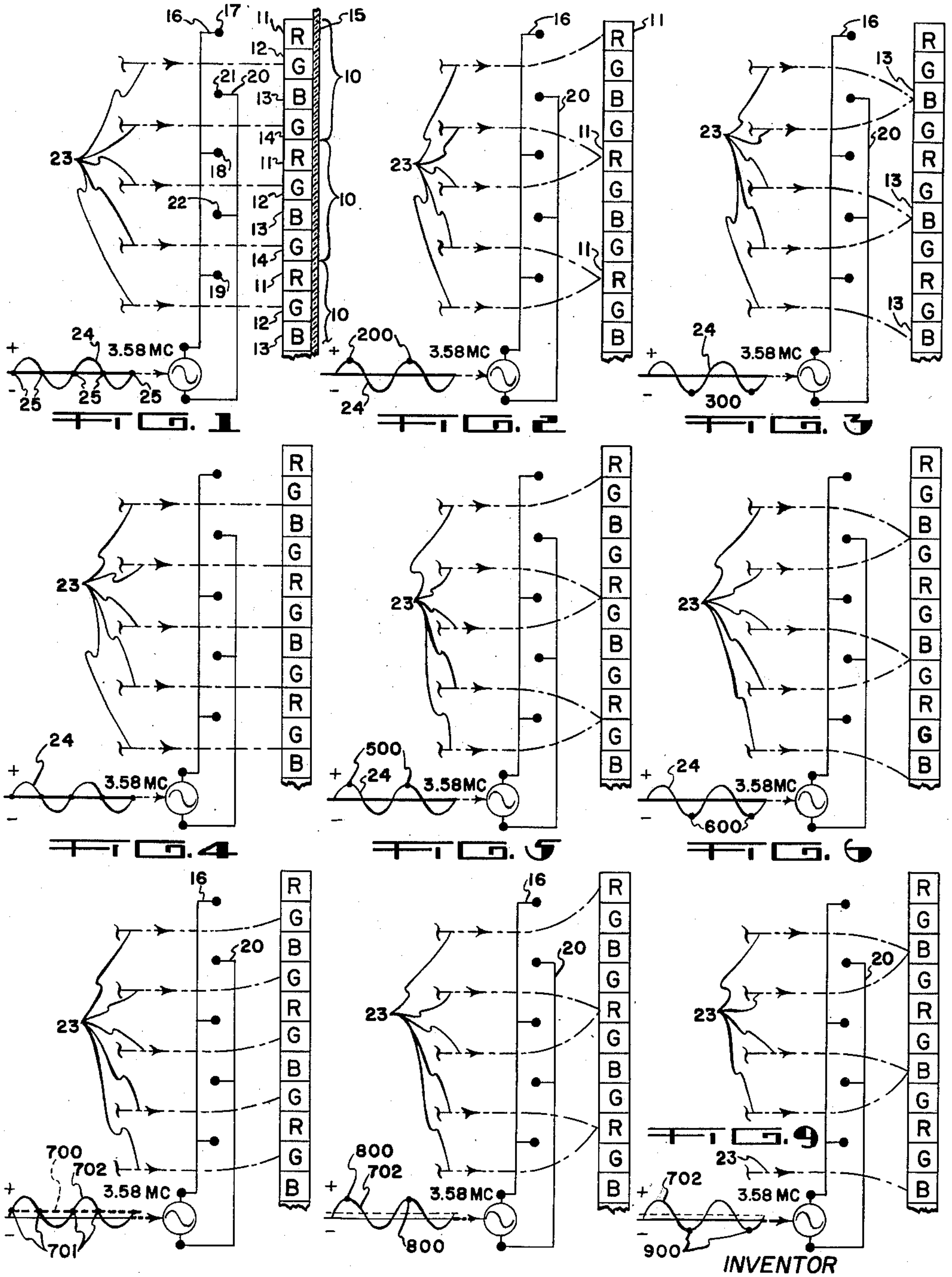
Figures 1 through 3 are elevational side views of the end portion of a Chromatron tube showing the color grids in the normal position relative to the face plate phosphor strips and the corresponding normal electron beam deflection patterns owing to a symmetrical input grid signal.
Figures 4 through 6 are elevational side views of the end portion of a Chromatron tube showing the color grids in a position slightly removed vertically from their normal positions relative to the face plate phosphor strips and the corresponding electron beam deflection pattern owing to a symmetrical input grid signal.
Figures 7 through 9 are elevational side views of the end portion of a Chromatron tube showing the color grids in a position slightly removed vertically from their normal positions relative to the face plate phosphor strips and the corresponding compensated normal electron beam deflection patterns owing to an asymmetrical input grid signal.

In Figure 1, phosphor strip groups 10, composed of red phosphor strip 11, green phosphor strip 12, blue phosphor strip 13, and green phosphor strip 14, are adjacently disposed upon Chromatron tube face plate 15. The portion of grid 16 appearing in Figure 1 consists of wires 17, 18 and 19. The portion of grid 20 appearing in Figure 1 consists of grid wires 21 and 22. Electron paths 23 constitute the path of the electron beam as this beam sweeps through its raster. In accordance with the structure of the Chromatron tube, electron beam paths 23 coincide with approximately the center of each green phosphor strip in the absence of a potential difference between grid 16 and grid 20. The configuration of electron paths 23 is shown in Figure 1 at the instantaneous time at which the applied grid voltage signal 24 passes through zero voltage magnitude points 25.

On the positive peaks of the grid input signal, as indicated by points 200 of grid input signal 24 shown in Figure 2, the electron beam paths will be deflected to the center of red phosphor strips 11, owing to the fact that grid 16 is charged positively with respect to grid 20. Hence, grid 16 may appropriately be called the "red" deflection grid.

On the negative peaks of grid input signal 24, represented by points 300, as shown in Figure 3, electron beam paths 23 will be deflected to the center of the several blue phosphor strips 13 by reason of electrostatic deflection produced by grid 16 when charged negatively with respect to grid 20. Hence, grid 20 may appropriately be called the "blue" deflection grid.

Suppose now that grid 16 and grid 20 are displaced vertically from their normal position, as shown in Figures 1 through 3, to positions indicated in Figures 4, 5 and 6. In such a case, the electron beam paths may impinge upon the phosphor strips, in the absence of a grid input signal, in regions approaching the blue phosphor strips. This is indicated in Figure 4. Then, by such a disposition of the red and blue deflection grids, there will be a contamination of color which will be apparent to the viewer's eyes.

Figure 5 indicates that when the grid input signal reaches its maximum value, as indicated by points 500 on grid input signal curve 24, the electron beams may well impinge in proximity to the several boundaries between the red and green phosphor strips. Thus, further color contamination results.

And, considering the configuration of the electron beam paths when the grid input signal 24 reaches its minimum values, as indicated by points 600, the electron beam paths may well converge upon the several boundaries separating the blue and green phosphor strips.

Suppose, however, that the grid input signal was of an asymmetrical type, having greater positive peaks than negative peaks, as is shown in Figure 7. The mean value of the signal would not occur at the zero reference axis but rather at a line somewhat above the reference axis, represented by dotted line 700 which runs through point 701 on signal curve 702. Hence, when the signal reaches point 701, grid 16 will have a potential which is slightly positive with respect to the potential of grid 20 and thus the electron beam will again return to the center of the green phosphor strips.

On the positive peaks of grid signal 702, represented by points 800 in Figure 8, the charge on the wires of grid 16 will be sufficient to pull the electron beam paths over to the center of the several red phosphor strips. Hence, even though the red deflection grid is displaced from the optimum position vertically, yet, by means of subject invention, the electron beam will impinge directly upon the center of the several red phosphor strips when signal 702 is passing through points 800.

Correspondingly, when signal 702 is passing through points 900 as shown in Figure 9, these points being the minimum peak amplitudes of signal 702, the electron beam paths will converge upon the centers of the several blue phosphor strips, and thus the grid 20 will truly serve as the "blue" deflection grid.

From the foregoing it is learned that, regardless of the magnitude and direction of displacement of the color grids of the Chromatron tube, such displacement may be compensated for by processing the normally symmetrical and sinusoidal 3.58 mc. subcarrier into an asymmetrical switching signal, the relative magnitudes of the positive and negative peaks of this signal being such as to satisfy the relative voltage requirements of the color grids of the Chromatron tube, according to the grid displacement from its normal position. It remains, therefore, to consider several circuits which will provide the necessary asymmetrical signal, and which will also provide a positive and negative peak amplitude adjustment for requirements of a particular Chromatron tube.

Figure 10:
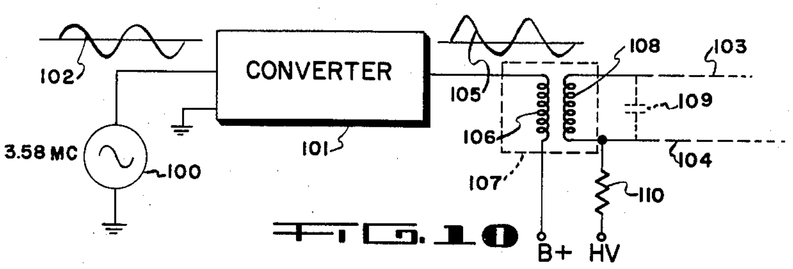
Figure 10 is a schematic diagram (partially in block form) in which is indicated a Chromatron grid drive converter which according to this invention processes the normally symmetrical 3.58 mc. subcarrier signal into an asymmetrical signal having the same frequency, for the purpose of supplying to each color grid its respective voltage requirement.

In Figure 10, signal source 100 is coupled to the input circuitry of converter stage 101. In a Chromatron television receiver, signal 102 consists of an amplified 3.58 mc. subcarrier signal which is separated by the first separator in the receiver from the composite color signal for the purpose of controlling the red deflection grid 103 and blue deflection grid 104 of the Chromatron picture tube. Converter 101 has such a design that the output signal therefrom will constitute an asymmetrical sinusoidal signal 105. As may be seen from Figure 10, the positive peaks of output signal 105 are of greater amplitude than the negative peaks. Asymmetrical signal 105 is coupled from primary winding 106 of transformer 107 to secondary winding 108, the end terminals of which are coupled to the color grid terminals of the Chromatron tube. In practice the inter-electrode capacitance 109 existing between color grids 103 and 104 constitutes, in conjunction with secondary winding 108 of transformer 107, a parallel resonant circuit the resonant frequency of which is equal to the chroma subcarrier frequency (3.58 mc.). The parallel resonant circuit thus constituted is coupled through an isolating resistor 110 to a source of high voltage. Referring again to Figures 7, 8 and 9, we see that regardless of the vertical displacement of the color grids, so long as converter 101 may be adjusted to produce an output signal 105 which meets the drive requirements of color grids 103 and 104, the Chromatron tube will operate quite satisfactorily and will produce no color contamination of consequence.

Hence, there remains only a description of several embodiments of this invention for discussion.

Figures 11, 12, 13:
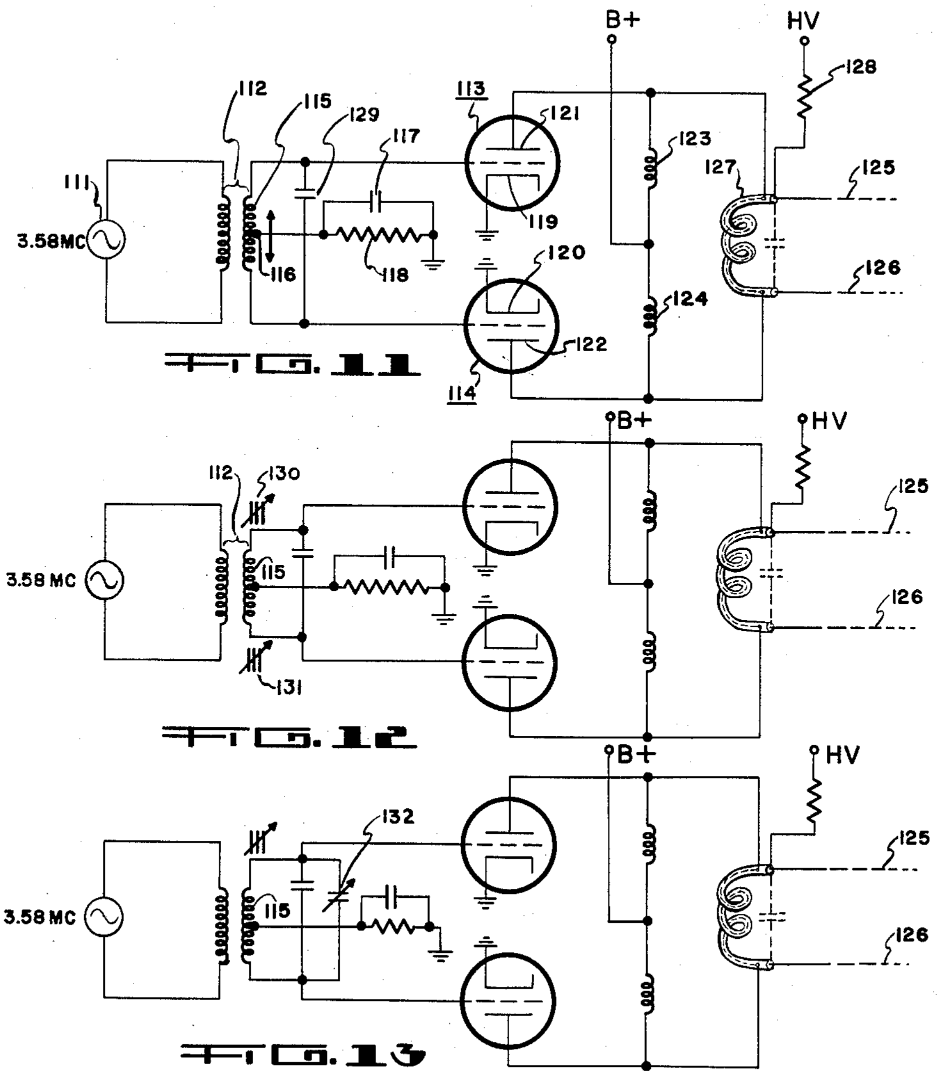
Figure 11 is a schematic diagram of a first embodiment of a converter circuit, according to this invention.
Figure 12 is a schematic diagram of a second embodiment of a converter circuit, according to this invention.
Figure 13 is a schematic diagram of a third embodiment of a converter circuit, according to the present invention.

In Figure 11, a first embodiment of the present invention, signal source 111 is coupled through transformer 112 to the grid input circuit of push-pull vacuum tubes 113 and 114. Secondary winding 115 of transformer 112 has a tap 116 which is coupled to ground through grid bias elements 117 and 118. Secondary winding 115 is also shunted by capacitor 129, this inductance-capacitance combination forming a parallel resonant circuit tuned to the source frequency (3.58 mc.). Cathodes 119 and 120 are maintained at ground potential. Anodes 121 and 122, of vacuum tubes 113 and 114, respectively, are coupled together through R. F. chokes 123 and 124 to a source of positive voltage (B+). The output from push-pull vacuum tubes 113 and 114 is coupled to color grids 125 and 126 by means of unity coupling coaxial transformer 127. To the color grid circuit is applied a high voltage through isolating resistor 128. The plate circuits of vacuum tubes 113 and 114 are conventional, and are employed in all shown and described embodiments of this invention. Unity coupling transformer 127 is of conventional type, and is employed quite commonly in Chromatron tube circuits. If the difference in drive requirements of grids 125 and 126 is known, then tap 116 of secondary winding 115 may be preset so that the asymmetrical signal drive from the output of push-pull vacuum tubes 113 and 114 will be such as to supply the necessary driving voltage to grids 125 and 126. In the ordinary case, the difference in drive voltage requirements in the color grids is not known, hence, tap 116 of secondary winding 115 may be of the adjustable type.

In order to obtain an asymmetrical signal according to this invention, it is necessary only to tap secondary winding 115 of transformer 112 at a point which is removed from its electrical center in amount dictated by the drive difference requirement of the Chromatron color grid. There are many ways, of course, in which this off-center inductance adjustment may be achieved. Figures 12 and 13 indicate other modes of off-center inductance adjustments. In Figure 12, adjustable tuning cores 130 and 131 are inserted at opposite ends of secondary winding 115 of transformer 112. The relative distances to which cores 120 and 121 are inserted in their respective ends of secondary winding 115 will dictate the degree of asymmetry of the output signal. It is quite possible to have tuning cores 130 and 131 physically coupled together so that the gradual insertion of one core will produce simultaneously the gradual withdrawal of the remaining core from its respective circumscribed position within the secondary winding. In Figure 13 only one tuning core is employed to tune secondary winding 115 as desired, in order to accommodate the voltage drive requirements of color grids 125 and 126. In this particular instance, however, a trimmer capacitor 132 is necessary to maintain the resonant frequency of the input parallel resonant circuit at the subcarrier value.

It is, of course, highly desirable to have a tuned circuit in the push-pull input circuitry so as to achieve as large a voltage gain as possible in a relatively few number of stages. Nevertheless, this invention is not restricted to tuned grid input circuits, but may be understood to include also push-pull input circuits which consist solely of the secondary winding of a coupling transformer. In this case, there would be no necessity for the insertion of circuit elements to adjust for a resonant subcarrier frequency once the inductance ratio desired was achieved.

Therefore, it is apparent that this invention supplies a novel means of correcting for variations in voltage drive requirements of the red and blue positioning color grids of the Chromatron tube by supplying an asymmetrical signal, the relative magnitudes of the positive and negative peaks of which may be controlled as desired by adjustment in the input circuitry of the particular type of converter circuit chosen for use.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. Means for converting a symmetrical sinusoidal electrical signal of a predetermined frequency into an asymmetrical sinusoidal electrical signal the positive half-cycle peak amplitude of which differs from the negative half-cycle peak amplitude thereof, said asymmetrical signal being thus adapted to drive the red and blue deflection grids of a color television picture tube and compensate for transverse displacement of such grids with respect to their corresponding phosphor strips, said converting means including, in combination, a transformer having a primary winding with first and second input terminals adapted for coupling to a sinusoidal signal source and a secondary winding with a center tap and first and second output terminals, at least one segment of said transformer secondary winding defined by said center tap and one secondary output terminal having an adjustable core for varying the inductance of said at least one segment relative to the other, a capacitive reactance coupled between the output terminals of the transformer for tuning the secondary winding to the predetermined frequency, first and second vacuum tubes each having anode, cathode, and control electrodes, said cathode electrodes of said vacuum tubes being maintained at a common reference potential, means coupled between said common reference potential and said center tap of said transformer secondary winding for deriving a bias voltage, said first output terminal of said transformer secondary winding being coupled to said control electrode of said first vacuum tube, said second output terminal of said transformer secondary winding being coupled to said control electrode of said second vacuum tube, and an output circuit coupled across said anode electrodes of said first and second vacuum tubes.

2. Means for converting a symmetrical sinusoidal electrical signal of a predetermined frequency into an asymmetrical sinusoidal electrical signal the positive half-cycle peak amplitude of which differs from the negative half-cycle peak amplitude thereof, said asymmetrical signal being thus adapted to drive the red and blue deflection grids of a color television picture tube and compensate for transverse displacement of such grids with respect to their corresponding phosphor strips, said converting means including, in combination, a transformer having a primary winding with first and second input terminals adapted for coupling to a sinusoidal signal source and a secondary winding with a center tap and first and second output terminals, at least one segment of said transformer secondary winding defined by said center tap and one secondary output terminal having an adjustable core for varying the inductance of said at least one segment relative to the other, a fixed capacitor coupled between said output terminals of said transformer secondary winding, a variable trimmer capacitor coupled between said output terminals of said transformer secondary winding to tune it to the predetermined frequency, first and second vacuum tubes each having anode, cathode, and control electrodes, said cathode electrodes of said vacuum tubes being maintained at a common reference potential, means coupled between said common reference potential and said center tap of said transformer secondary winding for developing a bias voltage, said first output terminal of said transformer secondary winding being coupled to said control electrode of said first vacuum tube, said second output terminal of said transformer secondary winding being coupled to said control electrode of said second vacuum tube, and an output circuit coupled across said anode electrodes of said first and second vacuum tubes.

3. Means for converting a symmetrical sinusoidal electrical signal of a predetermined frequency into an asymmetrical sinusoidal electrical signal the positive half-cycle peak amplitude of which differs from the negative half-cycle peak amplitude thereof, said asymmetrical signal being thus adapted to drive the red and blue deflection grids of a color television picture tube and compensate for transverse displacement of such grids with respect to their corresponding phosphor strips, said converting means including, in combination, a transformer having a primary winding with first and second input terminals adapted for coupling to a sinusoidal signal source and a secondary winding with a center tap and first and second output terminals, each of two segments of said transformer secondary winding as defined by said center tap and both secondary output terminals having a separate adjustable core for varying the inductance of one segment relative to the other, a capacitor coupled between said output terminals and said transformer secondary winding for tuning it to the predetermined frequency, first and second vacuum tubes each having anode, cathode and control electrodes, said cathode electrodes of said vacuum tubes being maintained at a common reference potential, means coupled between said common reference potential and said center tap of said transformer secondary winding for developing a bias voltage, said first output terminal of said transformer secondary winding being coupled to said control electrode of said first vacuum tube, said second output terminal of said transformer secondary winding being coupled to said control electrode of said second vacuum tube, and an output circuit coupled across said anode electrodes of said first and second vacuum tubes.

4. Means for converting a symmetrical sinusoidal electrical signal of a predetermined frequency into an asymmetrical sinusoidal electrical signal the positive half-cycle peak amplitude of which differs from the negative half-cycle peak amplitude thereof, said asymmetrical signal being thus adapted to drive the red and blue deflection grids of a color television picture tube and compensate for transverse displacement of such grids with respect to their corresponding phosphor strips, said converting means including, in combination, a transformer having a primary winding with first and second input terminals adapted for coupling to a sinusoidal signal source and a secondary winding with center tap and first and second output terminals, each segment of said transformer secondary winding defined by said center tap and both of said output terminals having an adjustable core, said cores being mechanically coupled so that the partial removal of one of said tuning cores from its associated winding segment will produce a partial insertion of the other tuning core with respect to its associated winding segment to vary the inductance of one segment relative to the other, a capacitor coupled between said output terminals of said transformer secondary winding for tuning it to the predetermined frequency, first and second vacuum tubes each having anode, cathode, and control electrodes, said cathode electrodes of said vacuum tubes being maintained at a common reference potential, means coupled between said common reference potential and said center tap of said transformer secondary winding for developing a bias voltage, said first output terminal of said transformer secondary winding being coupled to said control electrode of said first vacuum tube, said second output terminal of said transformer secondary winding being coulped to said control electrode of said second vacuum tube, and an output circuit coupled across said anode electrodes of said first and second vacuum tubes.

References Cited in the file of this patent

UNITED STATES PATENTS

| | | |
|---|---|---|
| 1,924,469 | Strecker | Aug. 29, 1933 |
| 2,070,071 | Stromeyer | Feb. 9, 1937 |
| 2,308,752 | Hadfield | Jan. 19, 1943 |
| 2,426,225 | Krause | Aug. 26, 1947 |
| 2,694,143 | Chambers | Nov. 9, 1954 |